Jan. 9, 1923.

D. F. FESLER.
LUBRICATING DEVICE.
ORIGINAL FILED NOV. 18, 1918

1,441,335

Inventor:
Douglas F. Fesler

Patented Jan. 9, 1923.

1,441,335

UNITED STATES PATENT OFFICE.

DOUGLAS F. FESLER, OF CHICAGO, ILLINOIS, ASSIGNOR TO THE BASSICK MANUFACTURING COMPANY, OF CHICAGO, ILLINOIS, A CORPORATION OF DELAWARE.

LUBRICATING DEVICE.

Original application filed November 18, 1918, Serial No. 262,930, now Patent No. 1,387,843, dated August 16, 1921. Divided and this application filed May 28, 1920, Serial No. 384,932. Renewed May 11, 1922. Serial No. 560,253.

*To all whom it may concern:*

Be it known that I, DOUGLAS F. FESLER, a citizen of the United States, residing at Chicago, in the county of Cook and State of Illinois, have invented a certain new and useful Improvement in Lubricating Devices, of which the following is a full, clear, concise, and exact description, reference being had to the accompanying drawings, forming a part of this specification.

My invention relates to improvements in a lubricating device, and is especially concerned with means for supplying lubricant under pressure to bearings or other surfaces to be lubricated. My invention comprises means whereby lubricant under high pressure can be initially supplied to the surfaces to be lubricated and other means for thereafter supplying lubricant to said surfaces at a considerably reduced pressure.

The objects of my invention are:

1st. To provide apparatus for performing the above functions, comprising in general a grease cup having a plunger therein, a spring confined between one end of the grease cup and the plunger, means for supplying lubricant under pressure to the space between the other side of the plunger and the opposite end of the grease cup, and means for conducting lubricant from said space to the bearing or surface to be lubricated, the means for supplying lubricant to said space under pressure comprising a grease gun or compressor, such as that disclosed in my copending application, Serial No. 262,930, filed November 18, 1918, of which this application constitutes a division, and which comprises a discharge nozzle and means for detachably connecting the discharge nozzle of the grease gun with the grease cup.

2nd. To provide a system of the character described, in which means is provided for supporting the plunger against the pressure of the lubricant when the grease cup is completely filled by lubricant under pressure, so that additional pressure can be exerted upon the lubricant in order to force it into the bearing with which the grease cup is connected under an extremely high pressure, whereby a supply of lubricant is insured to every point of contact of the bearing.

3rd. To provide a grease cup of novel construction forming a part of the above-described system which is simple in construction and economical to manufacture; and 4th. To provide a grease cup of the type described and having means for indicating the amount of lubricant which it contains.

Other objects will appear as this description progresses, reference being had to the accompanying drawings, in which Figure 1 is a side elevational view of my improved lubricating device;

Throughout the several views, similar reference characters will be used for referring to similar parts.

Figure 1:
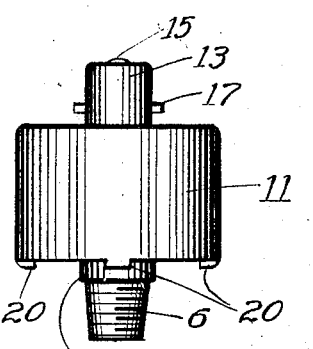
Figure 3:
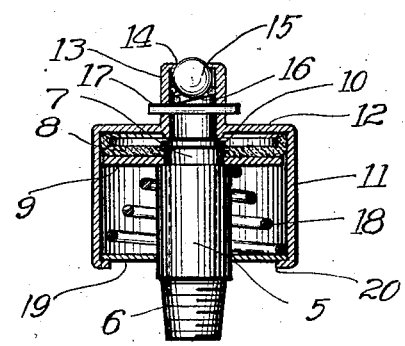
Figure 3 is a central longitudinal section.
Figure 2:
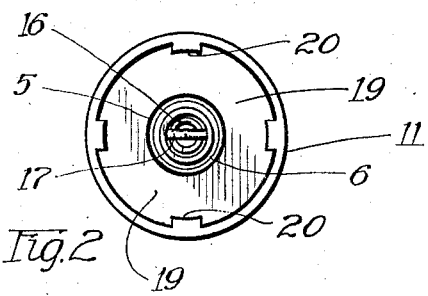
Figure 2 is a bottom view thereof.

My improved lubricating device comprises a conduit 5, the outer end of which is provided with screw threads 6 by means of which the device can be secured to a bearing to be lubricated. The inner end of the conduit 5 is reduced in diameter, as shown at 7, and supports the cup leather 8 and the follower 9, which together form a plunger. The extreme end of the tubular member 5 is swaged over as shown at 10 to hold the cup leather and follower in position. A preferably cylindrical receptacle 11 is slidably mounted upon the plunger and comprises an end closure 12 having an opening formed centrally thereof and carrying a tubular member 13, the bore of which registers with the opening in the end closure. The outer end of the tubular member 13 is flanged over, as shown at 14, to provide a seat for the closure 15. The closure 15 is yieldingly held against the seat 14 by means of a spring 16, the inner end of which abuts against the pin 17. The ends of the pin 17 project outwardly beyond the walls of the tubular member 13 to provide means for making a detachable connection with the coupling member of a lubricant compressor in the manner illustrated and described in my co-pending application referred to above.

The plunger is moved toward the end closure 12 of the lubricant receptacle by means of a spiral spring 18, which is confined between the plunger and a disk 19, which in turn is supported by lugs 20 turned inwardly from the lower end of the receptacle.

For supplying lubricant to a bearing to which my lubricating device is secured, the discharge conduit of a lubricant compressor, similar to that shown in my co-pending application above referred to, is connected with the tubular member 13 and the compressor is actuated to subject the lubricant to pressure. The lubricant thereupon flows through the discharge conduit of the compressor, the coupling member, past the closure 15, into the tubular member 13, the closure 15 being opened by the pressure of the lubricant. The tension of the spring 18 is so adjusted relatively to the resistance of the bearing to the passage of lubricant that the lubricant initially supplied to the receptacle reacts against the inner side of the plunger and the adjacent side of the end closure 12 to lift the end closure 12 away from the plunger, this movement continuing until the convolutions of the spring 18 are forced into a common plane against the disk 12, whereupon further movement of the receptacle relative to the plunger is prevented. The pressure upon the lubricant is then increased until it is sufficient to dislodge the old, used lubricant from the bearing and replace it with new lubricant. The compressor is then detached from the tubular member 13, whereupon the closure 15 closes, thus preventing the escape of lubricant from the receptacle, and the spring 18 gradually moves the receptacle downwardly upon the plunger, thereby displacing lubricant from the receptacle and gradually supplying it to the bearing.

Wherever I have used the words "upper" and "lower" or similar words in the specification, it is to be clearly understood that these expressions are merely relative and are not to be taken in their absolute sense.

While I have described the details of the preferred embodiment of my invention, it is to be understood that my invention is not limited to these details of construction, but is capable of other adaptations and modifications within the scope of the appended claims.

Having thus described my invention, what I claim is:

1. The combination with a conduit for making a connection with a bearing, of a plunger secured to the free end of said conduit, said plunger provided with an opening in registry with said conduit, a receptacle slidably mounted on said plunger, said receptacle having an end closure, a tubular member secured to said end closure and discharging therethrough, the outer end of said tubular member being provided with means for automatically preventing lubricant from flowing outwardly therethrough and means for making a detachable connection with a lubricant compressor, and a spring confined between said plunger and a portion of said receptacle for moving the end closure of said receptacle toward said plunger.

2. The combination with a conduit for making a connection with a bearing, of a plunger secured to the free end of said conduit, said plunger being provided with an opening communicating with said conduit, a receptacle slidably mounted on said plunger, said receptacle having an end closure, a tubular member secured to said end closure and discharging therethrough, the outer end of said tubular member being provided with means for automatically preventing lubricant from flowing outwardly therethrough and means for making a detachable connection with a lubricant compressor, and a spring for moving the end closure of said receptacle toward said plunger.

3. The combination with a conduit for making a connection with a bearing, of a plunger secured to the free end of said conduit, said plunger being provided with an opening communicating with said conduit, a receptacle slidably mounted on said plunger, said receptacle having an end closure, a tubular member secured to said end closure and discharging therethrough, the outer end of said tubular member being provided with means for automatically preventing lubricant from flowing outwardly therethrough and means for making a detachable connection with a lubricant compressor, and means for moving the end closure of said receptacle toward said plunger.

4. The combination with a conduit for making a connection with a bearing, of a plunger secured to the free end of said conduit, said plunger being provided with an opening communicating with said conduit, a receptacle slidably mounted on said plunger, said receptacle having an end closure, a tubular member secured to said end closure and discharging therethrough, the outer end of said tubular member being provided with means for making a detachable connection with a lubricant compressor, and means for moving the end closure of said receptacle toward said plunger.

5. The combination with a conduit for conducting lubricant to a bearing, of a plunger on the free end of said conduit, a receptacle slidable on said plunger, means for conducting lubricant under pressure to a space between said plunger and one end of said receptacle, and means for urging said end toward said plunger, the said means being located on the side of said plunger opposite the side contacted by lubricant.

6. The combination with a conduit for conducting lubricant to a bearing, a plunger on the free end of said conduit, a receptacle slidable on said plunger, means for conducting lubricant under pressure to the space between said plunger and one end of said receptacle, and a spring surrounding said conduit between said plunger and the bearing for urging said receptacle end toward said plunger.

In witness whereof, I hereunto subscribe my name this 21st day of May, 1920.

DOUGLAS F. FESLER.

Witnesses:
ALBIN C. AHLBERG,
ANDREW WINTERCORN.